T. G. PLANT.
HEEL BREASTING MACHINE.
APPLICATION FILED MAY 9, 1910. RENEWED MAY 29, 1912.

1,172,902.

Patented Feb. 22, 1916.

Witnesses:
Amelia M. Ross
Marion F. Kimball

Inventor:
Thomas G. Plant
by Robt. G. Hains
atty.

UNITED STATES PATENT OFFICE.

THOMAS G. PLANT, OF BOSTON, MASSACHUSETTS, ASSIGNOR TO UNITED SHOE MACHINERY COMPANY, OF PATERSON, NEW JERSEY, A CORPORATION OF NEW JERSEY.

HEEL-BREASTING MACHINE.

1,172,902.

Specification of Letters Patent.

Patented Feb. 22, 1916.

Application filed May 9, 1910, Serial No. 560,239. Renewed May 29, 1912. Serial No. 700,495.

*To all whom it may concern:*

Be it known that I, THOMAS G. PLANT, a citizen of the United States, residing at Boston, in the county of Suffolk and State of Massachusetts, have invented an Improvement in Heel-Breasting Machines, of which the following description, in connection with the accompanying drawings, is a specification, like letters on the drawings representing like parts.

The invention to be hereinafter described relates to heel breasting machines, and more particularly to the means for sustaining or supporting the breasting stop from the machine frame during the action of the heel breasting means.

The present invention is a development of that shown, described and claimed in prior application, Serial No. 501,449, filed Jan. 11, 1909; and its aims and purposes are to provide the breasting stop supporting means with a simple and effective form of lock, so that when the breasting stop has met the shoe, the breasting stop supporting means may move into position to support the breasting stop and be effectively locked, all as will be more fully set forth hereinafter in connection with the accompanying drawings which disclose one form of means for carrying the invention into practical effect.

Figure 1:
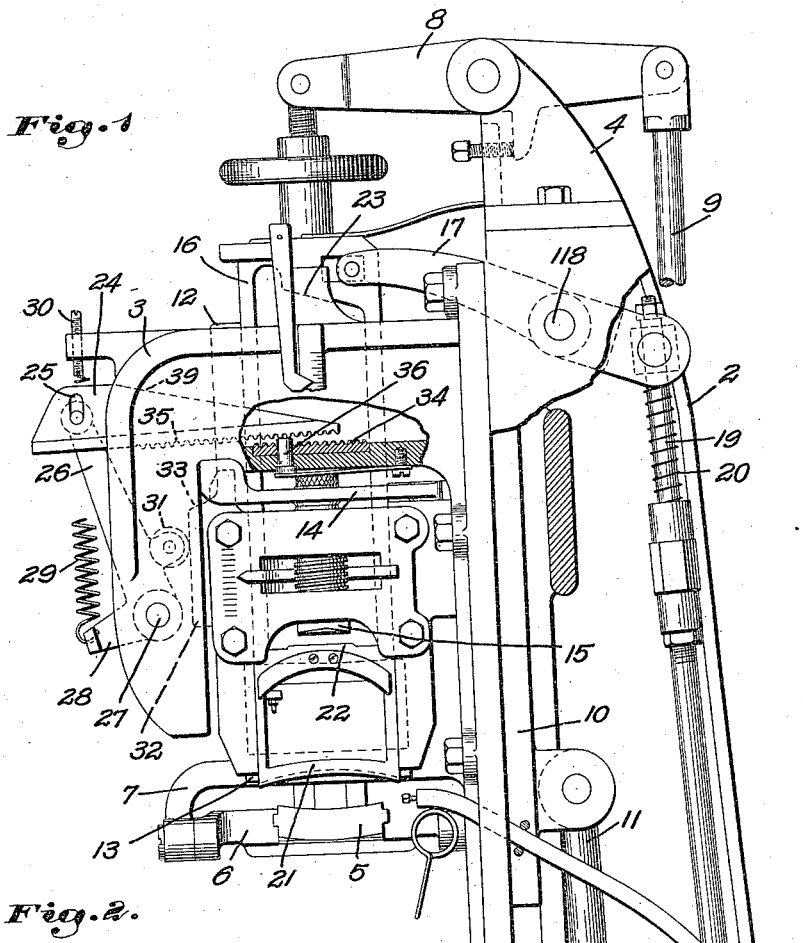
Figure 2:
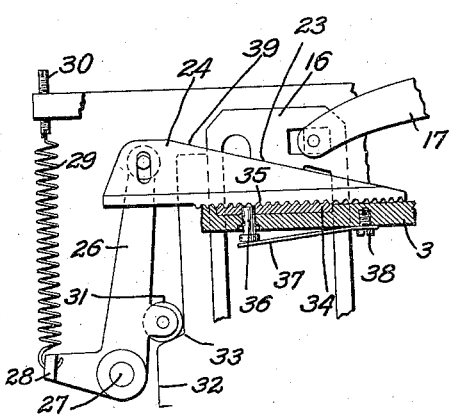

In the drawings: Figure 1 is a view in front elevation of the upper portion of a heel breasting machine embodying the present invention, some of the parts being in section or broken away to more clearly disclose others; and Fig. 2 is a detached detail showing the breasting stop supporting means and its associated parts.

The machine frame for supporting the operating parts may be of any usual and desired character, and herein is represented as a column 1, Fig. 1, having suitable upwardly extending portions 2 and brackets 3, 4 for sustaining and guiding the moving parts. These features may be any form and kind suitable to the purposes intended.

The presserfoot 5, its carrying arms 6 and 7, the presserfoot slide, the actuating lever 8 and the actuating rod 9, may be substantially as pointed out in the prior application hereinbefore mentioned, and such parts need no further elucidation at this time. Similarly the knife carrying slide 10, its actuating rod 11, the means for reciprocating the knife carrying slide, the knife carrier 12 and its knife 13 detachably sustained upon the knife carrier by means of the swinging arm 14 to be readily disengaged therefrom, and the foot 15 adjustable in the knife carrier by means of its adjusting screw for limiting the extent of downward movement of the knife, may be as pointed out in said prior application, or otherwise, and, as such parts are fully shown and described in said prior application, further description and elucidation thereof is unnecessary. As pointed out in said prior application, also, the breast stop carrier 16 is sustained in suitable guides for vertical movement by means of its actuating lever 17 pivoted at 18 and yieldingly operated by the actuating rod 19 and its spring 20 from a suitable source of power, and herein may be substantially the same as fully described and shown in the said prior application.

The breasting stop 21 carried by the carrier 16 preferably has its lower edge concaved somewhat, as indicated in Fig. 1, to properly coact with the contour of the shoe bottom to prevent injury thereto, and said breasting stop carrier may have the breasting stop portion 22, as pointed out in said prior application, to coact with the foot 15 connected to the knife slide, the construction being such that when the breasting stop is in its lowered position and the knife proceeds on its cutting stroke, the parts 15 and 22 will come together and the knife will be arrested by the breasting stop before it has injured the sole of the shoe. The breasting stop carrier 16 has an inclined shoulder or surface portion 23 which is adapted to engage a similarly inclined portion of a carrier support 24 under conditions to be hereinafter referred to.

The carrier support 24 is provided with a slot 25 to which is connected one arm 26 of an actuator pivoted at 27 and having an arm 28 to which is connected a spring 29, the upper end of which is attached to an adjusting screw 30, the construction being such that the actuator will normally tend to move the carrier support 24 to the right, or into coacting relation with the inclined shoulder 23 on the breasting stop carrier, when said carrier support is free for such movement.

Mounted on the arm 26 of the actuator is a roll 31 which is normally engaged by a cam track 32 carried by the knife slide, when the parts are in non-breasting position, that is, with the knife raised. This track 32 has a cut-away portion 33, which, as the knife descends, comes opposite the roll 31 and permits the spring 29 to move the carrier support 24 into carrier supporting position.

The parts thus far described may be substantially as fully disclosed in the said prior application or they may be modified in form, character or design to suit the conditions of use. In said prior application when the carrier support had been moved into coöperative relation with the stop carrier, a lock was provided to hold the carrier support in its carrier supporting position.

The present invention contemplates as one of its characteristics the provision of means for locking the carrier support in its carrier supporting position, such means acting to prevent movement of the support in either direction, as will be hereinafter more fully described. As one means of carrying this feature of the invention into effect, the supporting frame or bracket 3 is provided with a plate 34, the surface of which is corrugated or provided with teeth, as indicated in Figs. 1 and 2. The carrier support 24 is likewise provided on its lower edge portion with a series of teeth 35 which are adapted to coact with the teeth of plate 34 when the carrier support 24 is moved into supporting position.

In order that the carrier support may be moved to and from its carrier supporting position, the said carrier support is yieldingly sustained with its teeth 35 normally out of engagement with the coacting teeth of the plate 34, and as one means of carrying this feature of the invention into effect a pin 36 is provided which projects through a suitable opening in the frame and bracket 3, the lower end of said pin being sustained by a spring or yielding element 37, secured in appropriate manner, as by a screw 38, to the machine frame or bracket 3, the construction being such that while the spring 37 supports the pin 36 in its upward projected position to maintain the teeth of the carrier support out of engagement with the teeth of the plate 34, yet any downward pressure upon the carrier support 24 will at once depress the supporting pin 36 and bring the opposed teeth into interlocking engagement.

From the construction thus described and from the operation of the parts as announced in said prior application, it will be noted that the breasting stop carrier is caused to be moved downward to bring its lower portion 21 into contact with the sole of a shoe, such action in the present form of the invention being effected through the actuating lever and rod 19 and its yielding spring 20. This movement of the breasting stop carrier brings its shoulder or inclined surface 23 into a position determined by the thickness of the work or the position thereof. Upon depression of the breasting knife carrier and its knife to perform the breasting operation, the cam track 32 moves downward until the roll 31 may move into the recessed portion 33, whereupon the carrier support 24 moves in response to the spring 29 to bring its inclined surface 39 into contact with the shoulder or inclined surface 23 of the breasting stop carrier. Owing to the inclined coöperating relation of these two surfaces, movement to the right of the support 24 causes the said support to be forced downward with sufficient energy to depress the supporting pin 36 against the tension of its sustaining spring 37 and causing the coacting teeth to interlock. It will be noted that this interlocking of the teeth takes place through the sliding contact of the two inclined surfaces 39 and 23, and the energy of the spring 29 is not sufficient to cause upward movement of the breasting stop carrier against its actuating spring 20, therefore all displacement of the breasting stop carrier and breasting stop, when the parts have once assumed operative position with respect to the work, is avoided. Upon further movement of the breasting knife during its heel breasting operation, the support 24 carried by the machine frame or other stationary part serves to sustain the breasting stop carrier, with the result that as the foot 15, moving with the breasting knife, contacts with the part 22 of the breasting stop carrier, further downward movement of the knife is arrested, and the arresting force is transmitted directly to the machine frame or other stationary part carrying the carrier support 24.

It will be noted that the interlocking teeth effectively prevent the carrier support from movement in either direction after they have become engaged, and that consequently as the support moves into this engaging position the teeth become interlocked before sufficient force is exerted on the support to disturb the correct position of the breasting stop carrier, and therefore, also, movement of the support in the reverse direction away from the supporting position is prevented upon the downward thrusting action of the knife.

Obviously various forms of yielding means may be devised for sustaining the carrier support 24 with the interlocking teeth in non-interlocking position to permit free movement of said support to and from carrier supporting position, but the simple device herein provided has been found to be a convenient and economical arrangement.

What is claimed is:

1. In a machine for acting on the heels of boots and shoes, the combination of a tool to act upon the heel, a stop adapted to contact with and be positioned by the shoe to limit the active stroke of the tool, means for positively supporting the stop independent of the shoe when in the position determined by the shoe, and a positive lock for preventing movement of said stop supporting means in either direction while the tool acts upon the heel.

2. In a heel breasting machine, the combination of heel breasting means, a breasting stop adapted to engage the sole of a shoe, a support for sustaining the breasting stop independent of the shoe as it arrests the action of the breasting means, means for moving the support in stop supporting position, and a lock operated by movement of the support for holding the support in operative position.

3. In a heel breasting machine, the combination of heel breasting means, a breasting stop adapted to engage the sole of a shoe, a support for sustaining the breasting stop independent of the shoe as it arrests the action of the breasting means, means for moving the support in stop supporting position, a lock for holding the support in supporting position, and means acting through upward movement of the breasting stop from the shoe to free the support from said lock.

4. In a heel breasting machine, the combination of heel breasting means, a breasting stop movable into contact with the shoe, a wedge for sustaining the breasting stop independent of the shoe during its arresting action, and a lock operated by movement of the wedge into stop sustaining position for locking the wedge.

5. In a heel breasting machine, the combination of heel breasting means, a breasting stop movable into contact with the shoe, a support for sustaining the breasting stop independent of the shoe during its arresting action of the breasting means, a lock for said support, one member of which is carried by the said stop support and the other by the machine frame, and means for yieldingly maintaining the members of the lock in non-locking relation and permitting them to interlock by movement of the support into supporting position.

6. In a heel breasting machine, the combination of heel breasting means, a breasting stop movable into contact with the shoe and having a shoulder, a support for sustaining the breasting stop independent of the shoe as it arrests the movement of the breasting means, said support having an inclined surface to engage the said shoulder, means for moving the support into supporting position, and coacting locking members movable into locking engagement by movement of said support into stop supporting position.

7. In a heel breasting machine, the combination of heel breasting means, a breasting stop movable into contact with the shoe, a stop support for sustaining the breasting stop independent of the shoe as it arrests the breasting means and having locking teeth, coacting locking teeth sustained by the machine frame, and means acting normally to maintain the two locking teeth out of engagement and permitting them to interlock when the stop support is moved into stop supporting position.

8. In a heel breasting machine, the combination of heel breasting means, a breasting stop movable into contact with the shoe and having a supporting shoulder connected thereto, a stop support for sustaining the breasting stop independent of the shoe as it arrests the breasting means and having an incline to coact with said shoulder when the stop support is in supporting position, locking members for said stop support normally held in non-locking position, and means for moving the stop support to place its incline in operative relation with said shoulder and to bring the locking members into locking engagement by movement of the stop support.

9. In a heeling machine, the combination of heel breasting means, a breasting stop movable into contact with the shoe and to determine the extent of action of the breasting means, a wedge for supporting the breasting stop independent of the shoe as it arrests the action of the breasting means, a series of locking teeth for locking the wedge in stop supporting position, and means to move the wedge to supporting position.

10. In a heeling machine, the combination of heel breasting means, a breasting stop movable into contact with the shoe and to determine the extent of action of the breasting means, a wedge for supporting the breasting stop independent of the shoe as it arrests the action of the breasting means, a series of locking teeth for locking the wedge in stop supporting position, means acting normally to maintain the locking teeth in unlocking position, and means for moving the wedge to stop supporting position and causing the locking teeth to lock the wedge from movement.

11. In a boot and shoe machine, the combination of a tool to act upon the work, a stop constructed and arranged to engage the work and determine the active stroke of the tool, a wedge for supporting the stop in the position assumed by it as determined by the work, and means for holding the wedge from movement in either direction under the stress of the work contacting stop.

12. In a machine for treating heels, the combination of a tool for engaging the heel, a stop constructed and arranged to engage the work and having a part to determine the finishing point of the tool stroke, a wedge to support the stop in the position determined by the work, and a normally inactive lock operative to prevent movement of the wedge in either direction as the work contacting stop arrests the active stroke of the tool.

13. In a machine for treating heels, the combination of a reciprocating tool for engaging the heel, means comprising a wedge for determining the point at which the stroke of the tool toward the work shall end, means controlled by a characteristic of the work for setting the wedge, and normally inactive means operative during the action of the tool for maintaining the wedge in position and from movement in either direction.

14. In a machine for acting upon a portion of a shoe, a tool, means comprising a wedge for automatically predetermining the limit of tool action in a direction toward the work in accordance with a characteristic of a shoe part, locking means for maintaining the wedge from movement in either direction, and means for normally holding the locking means inoperative and yielding under wedge induced movement to cause the wedge to be locked.

15. In a machine of the character described, the combination of a tool for acting upon the heel of a boot or shoe, unitary means for reciprocating said tool toward and from the work, means comprising a wedge for determining the finishing point of the effective operation of said tool in a direction toward the work under the action of said reciprocating means, and means acting positively to prevent movement of the wedge in either direction during the workward movement of the tool.

In testimony whereof, I have signed my name to this specification, in the presence of two subscribing witnesses.

THOMAS G. PLANT.

Witnesses:
ANNA L. HAGGERTY,
F. H. ROWSON.

Copies of this patent may be obtained for five cents each, by addressing the "Commissioner of Patents, Washington, D. C."